United States Patent
Yoo et al.

(10) Patent No.: US 6,298,192 B1
(45) Date of Patent: Oct. 2, 2001

(54) OPTICAL WAVEGUIDE DEVICE AND METHOD FOR FABRICATING THE SAME

(75) Inventors: Byong-Gwon Yoo; Hyung-Jae Lee; Tae-Hyung Rhee, all of Kyonggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/481,519

(22) Filed: Jan. 12, 2000

(30) Foreign Application Priority Data

Jan. 12, 1999 (KR) .......................................... 99-534

(51) Int. Cl.[7] ................ G02B 6/38; G02B 6/30
(52) U.S. Cl. ................ 385/137; 385/59; 385/49
(58) Field of Search ............... 385/137, 59, 49, 385/52, 88, 89, 97–99, 129–132; 264/1.24–1.26

(56) References Cited

U.S. PATENT DOCUMENTS

| | | | |
|---|---|---|---|
| 4,973,127 | * 11/1990 | Cannon, Jr. et al. | |
| 5,177,804 | 1/1993 | Shimizu et al. | |
| 5,367,593 | 11/1994 | Lebby et al. | |
| 5,371,820 | 12/1994 | Welbourn et al. | |
| 5,390,267 | 2/1995 | Yanagawa et al. | |
| 5,583,958 | 12/1996 | Yanagawa et al. | |
| 5,596,662 | 1/1997 | Boscher | |
| 5,706,378 | 1/1998 | Suzuki et al. | |
| 5,818,990 | 10/1998 | Steijer et al. | |
| 5,867,620 | * 2/1999 | Bunin et al. | 385/53 |

FOREIGN PATENT DOCUMENTS

0810456-A1 * 12/1997 (EP) .

OTHER PUBLICATIONS

Lee et al., filed on Jan. 14, 2000, Ser. No. 09/482,534, entitled "*Optical Fiber Array Connector And Method For Fabricating The Same*".

* cited by examiner

*Primary Examiner*—Rodney Bovernick
*Assistant Examiner*—Michael J. Stahl
(74) *Attorney, Agent, or Firm*—Robert E. Bushnell, Esq.

(57) ABSTRACT

Disclosed is an optical waveguide device having a structure capable of allowing the optical waveguide device to be easily connected with an optical fiber array connector while allowing an easy separation thereof from the optical fiber array connector. The optical waveguide device includes an upper substrate and a lower substrate each being provided at a main surface thereof with grooves each extending throughout the substrate in a direction corresponding to a coupling direction of the optical waveguide device to the optical fiber array connector, the upper and lower substrates being bonded to each other in such a fashion that the grooves of the upper substrate face those of the lower substrate, respectively, an optical waveguide portion formed at the main surface of one of the upper and lower substrates within a region defined between the grooves, tubes mounted between the facing grooves of the upper and lower substrates, respectively, each of the tubes having an insertion hole adapted to receive an alignment pin therein, and an adhesive adapted to bond the upper and lower substrates to each other and to bond the tubes to the upper and lower substrates.

28 Claims, 5 Drawing Sheets

OPTICAL WAVEGUIDE DEVICE AND METHOD FOR FABRICATING THE SAME

CLAIM OF PRIORITY

This application makes reference to, incorporates the same herein, and claims all benefits accruing under 35 U.S.C. §119 from our application OPTICAL WAVEGUIDE DEVICE AND METHOD FOR FABRICATING THE SAME filed with the Korean Industrial Property Office on Jan. 12, 1999 and there duly assigned Ser. No. 534/1999.

BACKGROUND OF THE INVENTION

1. Field of the Invention

The present invention relates to an optical waveguide device and a method for fabricating the optical waveguide device, and more particularly to an optical waveguide device having a structure capable of allowing the optical waveguide device to be easily connected with an optical fiber array connector.

2. Description of the Related Art

In order to appropriately couple an optical fiber to an optical waveguide device, an active alignment method has conventionally been used. In accordance with a conventional active alignment method, an optical fiber is aligned with one end of an optical waveguide device. In this a beam emitted from a light source is incident to the other end of the optical waveguide device so that it passes through the optical fiber. A measurement is then conducted to measure the power of the light beam emerging from the optical fiber. Based on the result of the measurement, the alignment of the optical fiber with the optical waveguide device is adjusted. After completion of the alignment, the optical fiber is bonded to the optical waveguide device using epoxy.

In order to conduct the above mentioned method, in which an optical fiber is aligned with and then coupled to an optical waveguide device, however, it is necessary to use expensive equipment requiring a very high accuracy. Furthermore, a lengthy process time is required because of careful and difficult manual tasks required in the above mentioned alignment and coupling. In addition, there is a disadvantage in that it is difficult to separate the coupled optical fiber from the optical waveguide device because the optical fiber is bonded to the optical waveguide device using epoxy.

Additional examples of apparatus and methods for connecting or coupling optical fiber arrays and waveguides are seen in the following U.S. Patents. U.S. Pat. No. 5,177,804, to Shimizu et al., entitled Waveguide-Type Optical Switch, describes a planar waveguide-type optical switch with three bases, the bases being aligned with each other using fitting pins passing through pin holes in the bases.

U.S. Pat. No. 5,367,593, to Lebby et al., entitled Optical/Electrical Connector And Method of Fabrication, describes an optical/electrical connector in which one package has ferrules engaged in holes in a base which joins with the package.

U.S. Pat. No. 5,371,820, to Welbourn et al., entitled Optical Hybrid Motherboard Interconnection System And Method Of Assembling Same, describes a hybrid optical motherboard in which metal pins in grooves of a submount of a connector are used to align the connector with another connector.

U.S. Pat. No. 5,390,267, to Yanagawa et al., entitled Optical Fiber/Terminal Connecting Device, describes an optical connecting device in which positioning pins inserted into positioning pin holes are used to align different optical connectors.

U.S. Pat. No. 5,583,958, to Yanagawa et al., entitled Composite Optical Device, describes a composite optical device having two chips which are connected using guide pins inserted into guide pin fitting holes formed from V-grooves in opposing faces of two plates making up the chip.

U.S. Pat. No. 5,596,662, to Boscher, entitled Multichannel Optical Connection Method for Optical Fibers, describes a multichannel optical connection process in which two assemblies are joined using pegs.

U.S. Pat. No. 5,706,378, to Suzuki et al., entitled Method Of Production Of Optical Waveguide Module, describes an optical waveguide chip assembly in which positioning grooves and guide pins are used to align the modules of the assembly.

U.S. Pat. No. 5,818,990, to Steijer et al., entitled Encapsulation Of Optoelectronic Components, describes an optoelectronic component with guide grooves and guide pins for connecting to another optocomponent.

However, these apparatus may suffer from problems associated with adhesive penetrating into the recesses where the alignment pins are inserted, leading to loss of accuracy of the alignment.

SUMMARY OF THE INVENTION

It is therefore an object of the invention to provide an improved optical waveguide device, and method of manufacturing the device.

Another object of the invention is to provide an optical waveguide device which can be connected to an optical fiber array connector without use of active alignment equipment.

A further object of the present invention is to provide an optical waveguide device allowing easy connection to an optical fiber array connector.

A yet further object of the present invention is to provide an optical waveguide device allowing easy separation from the optical fiber array connector.

A still further object of the invention is to allow coupling of an optical waveguide device to an optical fiber array connector without epoxy.

In accordance with these objects, the present invention provides an optical waveguide device configured to be connected with an optical fiber array connector, the optical waveguide device comprising: an upper substrate and a lower substrate each being provided at a main surface thereof with at least two grooves each extending throughout the substrate in a direction corresponding to a coupling direction of the optical waveguide device to the optical fiber array connector, the upper and lower substrates being bonded to each other in such a fashion that the grooves of the upper substrate face those of the lower substrate, respectively; an optical waveguide portion formed at the main surface of one of the upper and lower substrates within a region defined between the grooves; tubes mounted between the facing grooves of the upper and lower substrates, respectively, each of the tubes having an insertion hole adapted to receive an alignment pin therein; and an adhesive adapted to bond the upper and lower substrates to each other and to bond the tubes to the upper and lower substrates.

In accordance with another aspect, the present invention provides a method for fabricating an optical waveguide device configured to be connected with an optical fiber array connector comprising the steps of: preparing two substrates; etching each of the substrates in such a fashion that the substrate is formed at a main surface thereof with at least two grooves each extending throughout the substrate in a direction corresponding to a coupling direction of the optical waveguide device to the optical fiber array connector; forming an optical waveguide portion at the main surface of one of the substrates within a region defined between the grooves; mounting, on one of the substrates, tubes each having an insertion hole adapted to receive an alignment pin therein in such a fashion that each of the tubes are partially received in an associated one of the grooves of the substrate while being partially protruded firm the associated groove; bonding the substrates to each other in such a fashion that the protruded portions of the tubes are received in respective grooves of the other substrate while bonding the tubes to the substrates; and grinding end surfaces of the resulting structure obtained after completion of the bonding step.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
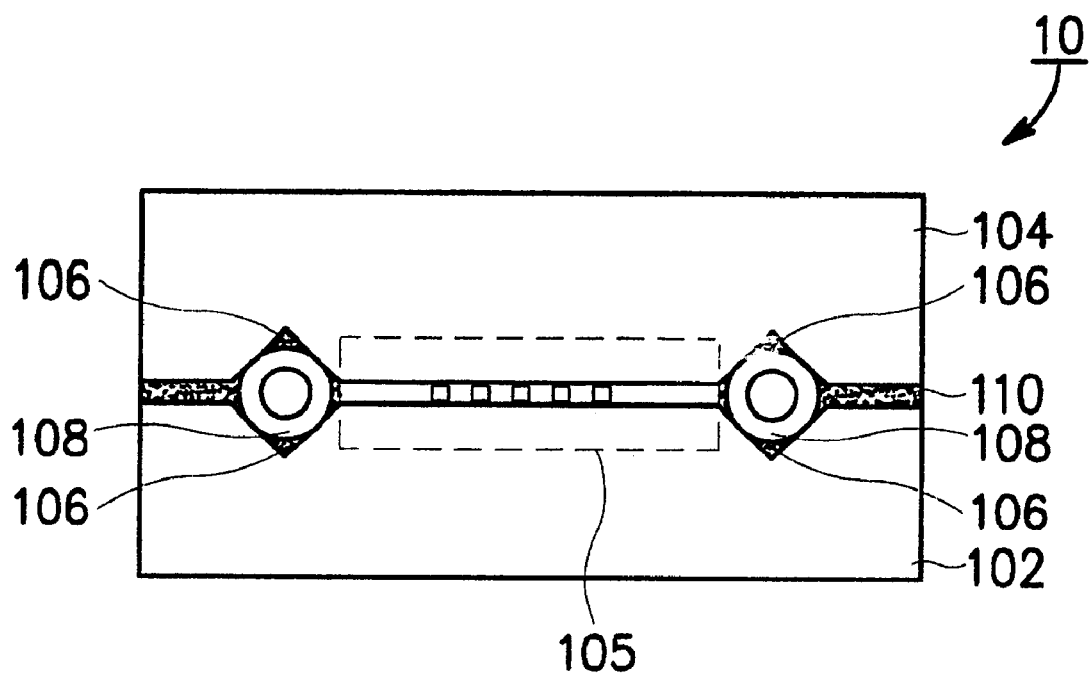
FIG. 1 is a cross-sectional view illustrating an optical waveguide device according to an embodiment of the present invention.

FIG. 1 is a cross-sectional view illustrating an optical waveguide device according to an embodiment of the present invention. Referring to FIG. 1, the optical waveguide device, which is denoted by the reference numeral 10, includes a lower substrate 102 and an upper substrate 104. Each of the lower and upper substrate 102 and 104 is provided at one main surface thereof with a pair of spaced V-shaped grooves 106 extending throughout the associated based plate in a direction corresponding to a coupling direction of the optical waveguide device to an optical fiber array connector. The lower substrate 102 is also provided with an optical waveguide portion 105 at a region defined between the V-shaped grooves 106 thereof. The optical waveguide portion 105 has waveguides to be connected with optical fibers of the optical fiber array connector, respectively. A pair of tubes 108, each of which has an insertion hole for receiving an alignment pin, are mounted in the V-shaped grooves 106 of the lower substrate 102, respectively. The upper substrate 102 is bonded to the lower substrate 102, using an adhesive such as epoxy, in such a fashion that its main surface formed with the V-shaped grooves 106 faces the grooved main surface of the lower substrate 104 while receiving the tubes 108 partially protruded from the grooved main surface of the lower substrate 104 at the V-shaped grooves 106 thereof, respectively. The mounting of the tubes 108 is also achieved using an adhesive 110 such as epoxy. Although the grooves 106 have a V cross-sectional shape in order to allow an easy mounting of circular tubes, they may have various cross-sectional shapes, for example, a U shape or a semicircular shape, in accordance with the shape of the tubes 108 to be inserted therein.

Figure 2:
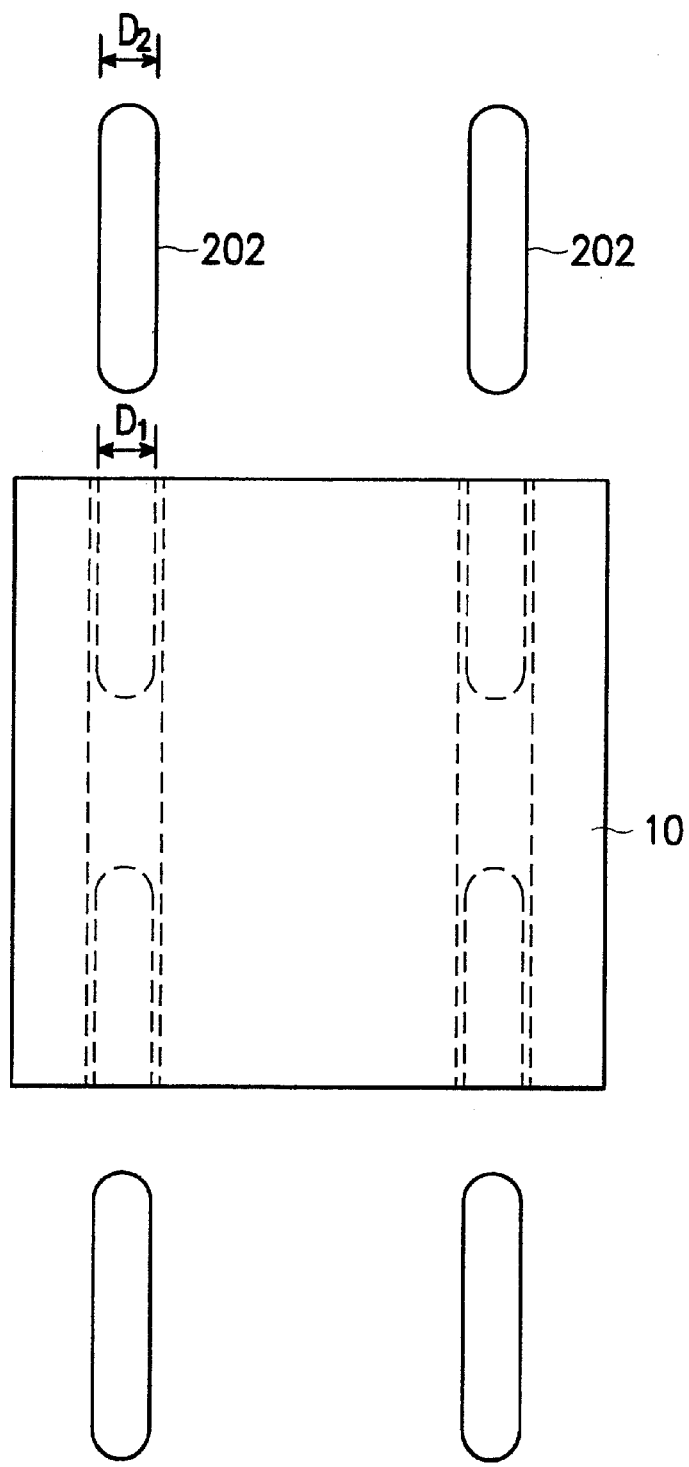
FIG. 2 is a plan view illustrating an insertion of alignment pins into the optical waveguide device according to the embodiment of the present invention to couple the optical waveguide device to an optical fiber array connector.

FIG. 2 is a plan view illustrating an insertion of alignment pins into the optical waveguide device according to the embodiment of the present invention to couple the optical waveguide device to an optical fiber array connector. In FIG. 2, the illustration of the optical waveguide portion is omitted in order to more clearly illustrate the insertion procedure for alignment pins and the dimensions of the alignment pins and associated insertion holes. Referring to FIG. 2, alignment pins 202 are inserted into the insertion holes of the optical waveguide device, respectively. To this end, the insertion holes of the optical waveguide device have an inner diameter $D_1$ larger than the outer diameter $D_2$ of the alignment pins 202. However, if the inner diameter $D_1$ of the optical waveguide device is excessively larger than the outer diameter $D_2$ of the alignment pins 202, then an alignment error may occur. Accordingly, it is preferred that the inner diameter $D_1$ of the optical waveguide device is larger than the outer diameter $D_2$ of the alignment pins 202 by one micron or less. After the optical waveguide device is coupled to the optical fiber array connector as mentioned above, they are fixed together by clips (not shown). Since the waveguides of the optical waveguide device are accurately aligned with respective optical fibers of the optical fiber altay connector in accordance With the above mentioned configuration, the waveguides can reliably conduct their function to receive light beams from respective optical fibers of the optical fiber array connector and guide them.

As mentioned above, the alignment pins 202 are inserted into respective insertion holes of the tubes 108 in the optical waveguide device in accordance with the present invention. Accordingly, it is possible to avoid an alignment error caused by a penetration of an adhesive into the insertion holes. This results in an accurate connection of the waveguides with respective optical fibers of the optical fiber array connector. In addition, the optical waveguide device according to the present invention can be easily separated from the optical fiber array connector and easily connected again to the optical fiber array connector because no adhesive is used for the connection.

Figure 3:
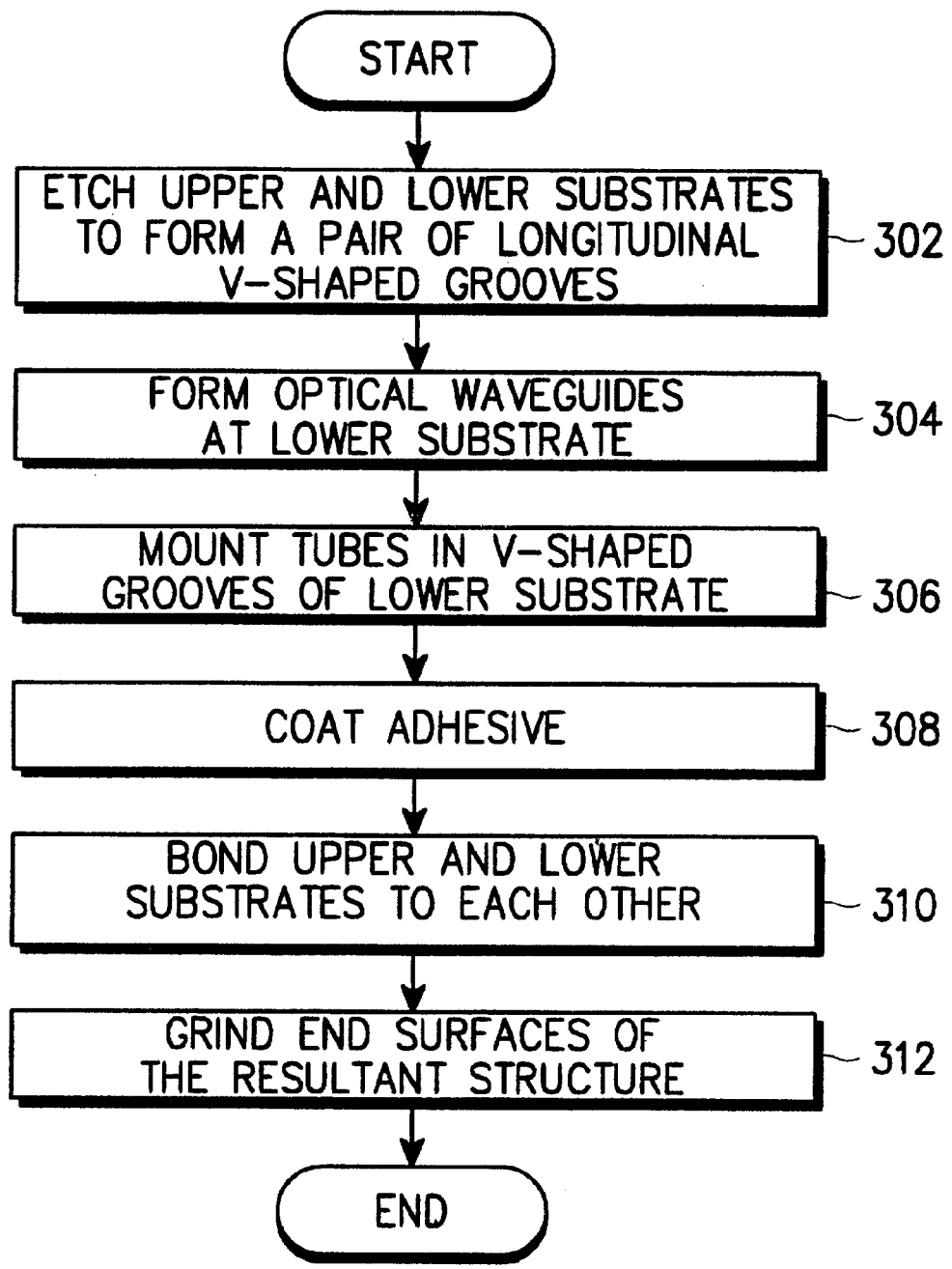
FIG. 3 is a flow chart illustrating a method for fabricating the optical waveguide device in accordance with the present invention.

FIG. 3 is a flow chart illustrating a method for fabricating the optical waveguide device having the above mentioned configuration in accordance with the present invention.

In accordance with this method, a pair of V-shaped grooves are formed, using an etching process, at an upper surface of each of lower and upper substrates in such a fashion that they extend throughout the associated substrate in a direction corresponding to a coupling direction of the optical waveguide device to an optical fiber array connector (Step 302). Each of the lower and upper substrates may be made of a material selected from the group consisting of silicon, glass, ceramic, and plastic. The selection of the material of the substrates is made taking into consideration a strength and a flexibility required for those substrates.

Figure 4A:
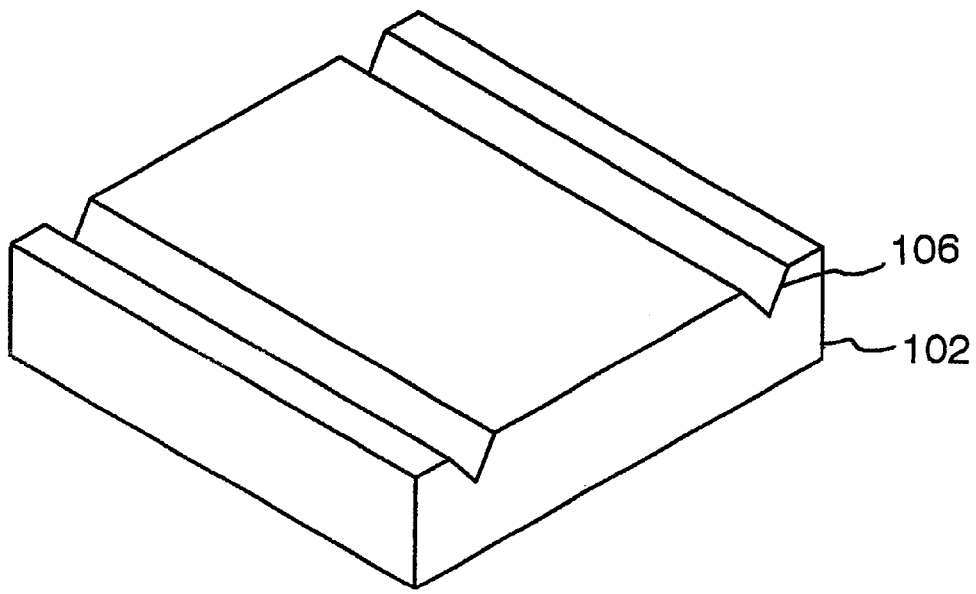
FIG. 4a is a perspective view illustrating a substrate subjected to an etching process for the formation of V-shaped grooves in accordance with the method of the present invention.

FIG. 4a illustrates one of the substrates subjected to the etching process for the formation of V-shaped grooves in accordance with the method of the present invention. Referring to FIG. 4a, the grooves formed at the upper surface of the substrate preferably have a V cross-sectional shape. However, the grooves may have a U shape or a semicircular shape.

The etching step 302 for the formation of V-shaped grooves may be carried out using a variety of etching processes. For example, the etching step 302 may be carried out by forming a mask on the upper surface of each substrate in such a fashion that it covers the upper surface of the substrate, except for the region where the V-shaped grooves are to be formed, and then wet-etching the substrate by use of the mask using a potassium hydroxide solution.

Figure 4B:
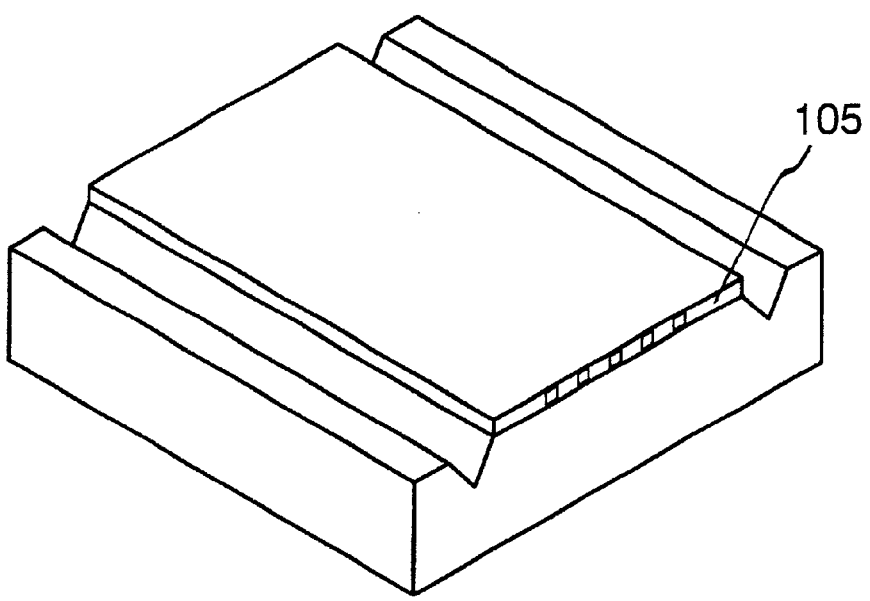
FIG. 4b is a perspective view illustrating a structure obtained after the substrate is subjected to a processing step for the formation of an optical waveguide portion in the method of the present invention.

Thereafter, an optical waveguide portion having optical waveguides is formed at the upper surface of one of the substrates within a region defined between the V-shaped grooves (Step 304). This step 304 may be carried out by sequentially forming a lower clad layer, a core layer, and an upper clad layer over the substrate using silica and optical polymer, respectively, while conducting an etching process using a mask having an appropriate pattern, following every formation step for those layers, thereby patterning each of those layers. Referring to FIG. 4b, the structure shown is obtained after one of the substrates, namely, the lowey substrate, is subjected to step 304 for the formation of the optical waveguide portion.

Figure 4C:
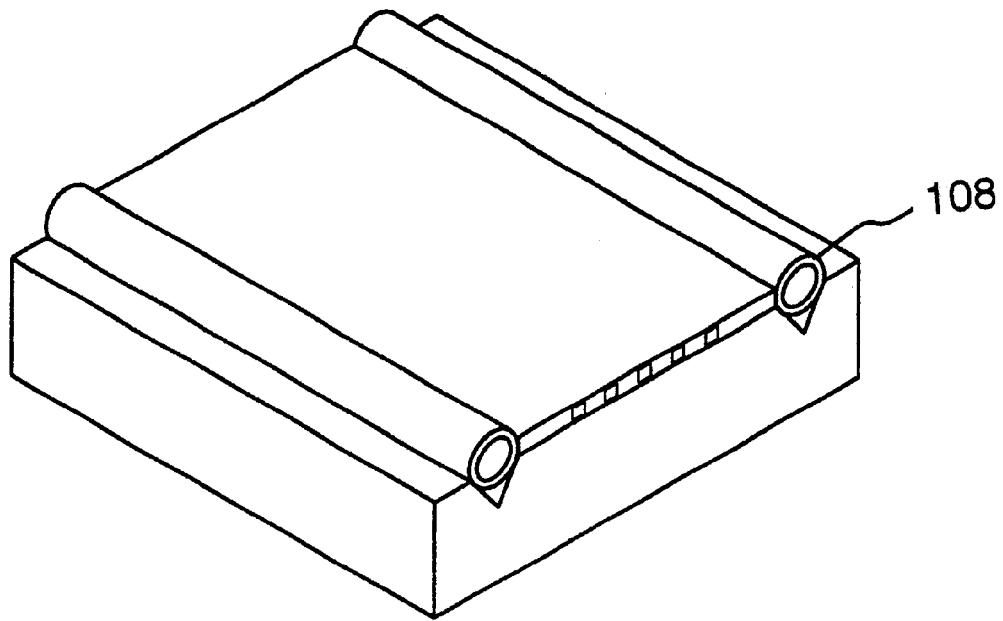
FIG. 4c is a perspective view illustrating a structure obtained after completion of a tube mounting step in the method of the present invention.

A pair of tubes, each of which has an insertion hole for receiving an alignment pin, are mounted on the lower substrate formed with the optical waveguide portion in such a fashion that they are in contact with the V-shaped grooves 106 of the lower substrate at their outer surfaces, respectively (Step 306). It is important for each of the tubes to be made of a material exhibiting a superior proccessability capable of allowing the tube to have a high concentricity, along with an appropriate strength and an appropriate hardness. Preferably, the material of the tubes is made of a material selected from the group consisting of glass ceramic, metal, and plastic. Referring to FIG. 4c, the structure obtained after completion of the tube mounting step is illustrated.

Figure 4D:
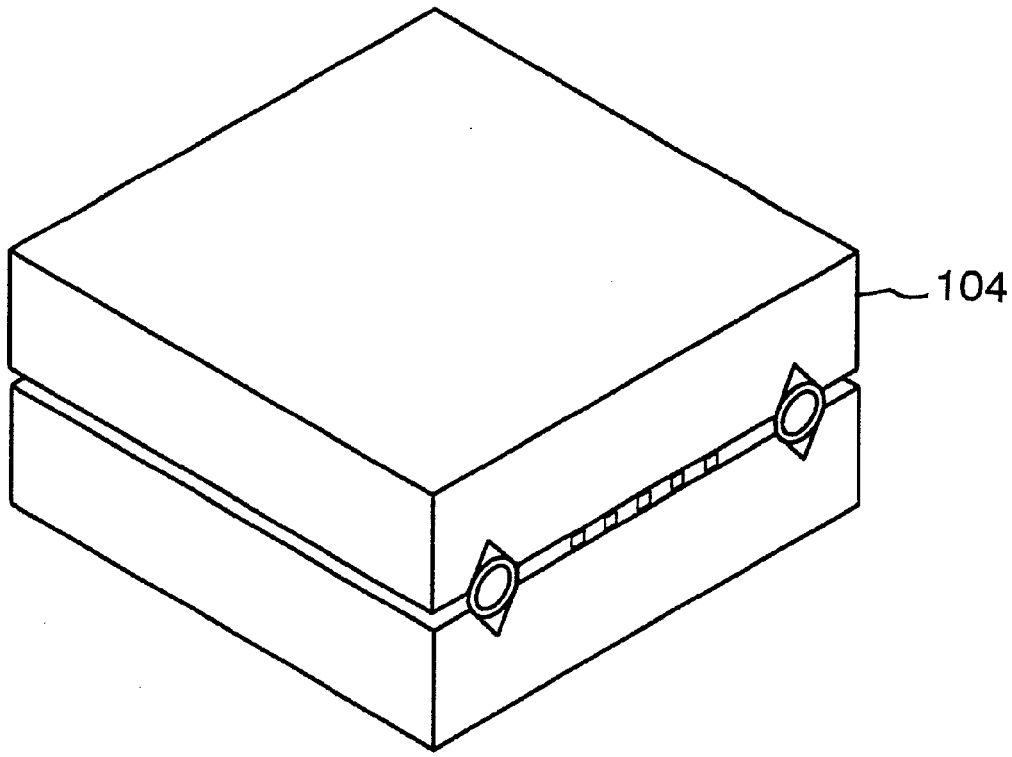
FIG. 4d is a perspective view illustrating a structure obtained after completion of a bonding step in the method of the present invention.

Subsequently, the other substrate, namely, the upper substrate, is bonded to the lower substrate, using an adhesive. This is achieved by coating an adhesive between the upper and lower substrates and between each of the tubes and the surface of the associated V-shape groove contacting the tube (Step 308), and pressing the upper substrate against the lower substrate, thereby bonding those substrates to each other (Step 310). Referring to FIG. 4d, the structure shown is obtained after completion of the bonding step.

The structure of FIG. 4d has rough end surfaces due to the adhesive residual on those end surfaces, the optical waveguide portion protruded from those end surfaces, or a misalignment of the substrates. To this end, the rough end surfaces of the structure are ground using an appropriate process such as a polishing process (Step 312). Thus, an optical waveguide device according to the present invention is fabricated.

As apparent from the above description, the optical waveguide device of the present invention has a structure capable of allowing the optical waveguide device to be easily and simply connected with an optical fiber array connector while allowing an easy separation thereof from the optical fiber array connector.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An optical waveguide device configured to be connected with an optical fiber array connector, the optical waveguide device comprising:

an upper substrate and a lower substrate each being provided at a main surface thereof with at least two grooves each extending throughout the substrate in a direction corresponding to a coupling direction of the optical waveguide device to the optical fiber array connector, the upper and lower substrates being bonded to each other in such a fashion that the grooves of the upper substrate face those of the lower substrate, respectively;

an optical waveguide portion formed at the main surface of one of the upper and lower substrates within a region defined between the grooves;

tubes mounted between the facing grooves of the upper and lower substrates, respectively, each of the tubes having an insertion hole adapted to receive an alignment pin therein; and an adhesive adapted to bond the upper and lower substrates to each other and to bond the tubes to the upper and lower substrates.

2. The optical waveguide device according to claim 1, wherein each of the grooves has a V cross-sectional shape.

3. The optical waveguide device according to claim 1, herein each of the upper and lower substrates is made of a material selected from the group consisting of silicon, glass, ceramic, and plastic.

4. The optical waveguide device according to claim 1, wherein the insertion hole has a circular cross-sectional shape for allowing a cylindrical alignment pin to be inserted therein.

5. The optical waveguide device according to claim 4, wherein the insertion hole has an inner diameter larger than a diameter of the alignment pin by one micron or less.

6. The optical waveguide device according to claim 1, wherein the insertion hole is a through hole being open at both ends thereof.

7. The optical waveguide device according to claim 1, wherein each of the tubes is made of a material selected from the group consisting of glass, ceramic, metal, and plastic.

8. A method for fabricating an optical waveguide device configured to be connected with an optical fiber array connector, comprising the steps of:

preparing two substrates;

etching each of the substrates in such a fashion that the substrate is formed at a main surface thereof with at least two grooves each extending throughout the substrate in a direction corresponding to a coupling direction of the optical waveguide device to the optical fiber array connector;

forming an optical waveguide portion at the main surface of one of the substrates within a region defined between the grooves;

mounting, on one of the substrates, tubes each having an insertion hole adapted to receive an alignment pin therein in such a fashion that each of the tubes are partially received in an associated one of the grooves of the substrate while being partially protruded from the associated groove;

bonding the substrates to each other in such a fashion that the protruded portions of the tubes are received in respective grooves of the other substrate while bonding the tubes to the substrates; and grinding end surfaces of the resulting structure obtained after completion of the bonding step.

9. The method according to claim 8, wherein the step of etching each of the substrates comprises the steps of:

forming a mask on the main surface of the substrate in such a fashion that it covers the main surface of the substrate, except for a region where the grooves are to be formed; and wet etching the substrate by use of the mask while using a potassium hydroxide solution.

10. The method according to claim 8, wherein the grooves formed at the step of etching each of the substrates have a V cross-sectional shape.

11. The method according to claim 8, wherein each of the tubes mounted at the mounting, step has a hollow circular cross-sectional structure defined with a concentric hole serving as the insertion hole of the tube and having a diameter larger than a diameter of the alignment pin by one micron or less.

12. An optical waveguide device, comprising:

a rectangular lower substrate having a surface having two parallel grooves extending lengthwise from one side of the lower substrate to the opposite side of the lower substrate;

an optical waveguide portion disposed on the surface of the lower substrate between said two grooves, and extending from said one side of the substrate to said opposite side of the lower substrate;

a first hollow tube disposed in one of said grooves, the ends of the first hollow tube being flush respectively with the one side and opposite side of said lower substrate;

a second hollow tube disposed in the other of said grooves, the ends of the second hollow tube being flush respectively with the one side and opposite side of said lower substrate; and an upper substrate of the same length as said lower substrate, said upper substrate having a surface having two parallel grooves spaced the same distance apart as said grooves of the lower substrate, and extending lengthwise from one side of the upper substrate to the opposite side of the upper substrate, said first and second hollow tubes disposed in the grooves of the upper substrate such that the ends of the hollow tubes are respectively flush with the one side and opposite side of said upper substrate.

13. The optical waveguide device of claim 12, further comprising:

a first alignment pin partially inserted into the bore at the end of one of the two tubes on one side of the device; and a second alignment pin partially inserted into the bore at the end of the second of the two tubes on the one side of the device.

14. The optical waveguide device of claim 12, further comprising:

adhesive mounting the tubes in the grooves.

15. The optical waveguide device of claim 12, said grooves having a V-shape in cross-section.

16. The optical waveguide device of claim 12, said grooves having a U-shape in cross-section.

17. The optical waveguide device of claim 12, said grooves having a semicircular shape in cross-section.

18. The optical waveguide device of claim 13, the inner diameter of the bore of said tubes being larger, by less than 1 micron, than the outer diameter of said alignment pins.

19. The optical waveguide device of claim 12, said tubes being made of a material selected from glass, ceramic, metal and plastic.

20. The optical waveguide device of claim 16, said hollow tubes being non-circular in cross-section.

21. A method of using the optical waveguide device of claim 12 comprising the steps of:

partially inserting pins fitting snugly into the insertion holes of the two tubes on one side of the optical waveguide device; and inserting the portions of said pins protruding from the two tubes into insertion holes of an optical fiber array coupler.

22. A method of manufacturing an optical waveguide device, comprising the steps of:

etching two parallel grooves in a longitudinal direction on a surface of a lower substrate;

etching two parallel grooves in the longitudinal direction on a surface of an upper substrate, the parallel grooves of the upper substrate spaced apart by the same distance as the grooves of the lower substrate;

forming an optical waveguide portion on the surface of the lower substrate between the two parallel grooves;

mounting a tube in each of the grooves of the lower substrate;

bonding the upper substrate to the lower substrate such that the grooves of the upper substrate contact the two tubes; and polishing the longitudinal ends of the bound upper and lower substrates.

23. The method of claim 22, said parallel grooves of the upper and lower substrates being V-shaped in cross-section.

24. The method of claim 22, said parallel grooves of the upper and lower substrates being U-shaped in cross-section.

25. The method of claim 22, said parallel grooves of the upper and lower substrates being semicircular in cross-section.

26. The method of claim 22, said step of forming an optical waveguide portion further comprising the steps of:

forming a patterned lower clad layer, core layer and upper clad layer sequentially on the surface of the substrate.

27. The method of claim 22, said tubes being made of material selected from glass, ceramic, metal and plastic.

28. The method of claim 22, said step of bonding the upper substrate to the lower substrate further comprising:

coating an adhesive between the upper substrate and lower substrate and between each of the tubes and the surface of the groove contacting the tube; and pressing the upper substrate against the lower substrate.

* * * * *